Oct. 17, 1950          J. J. MITNICK          2,526,258
FRUIT JUICE EXTRACTOR
Filed June 24, 1947          3 Sheets-Sheet 1
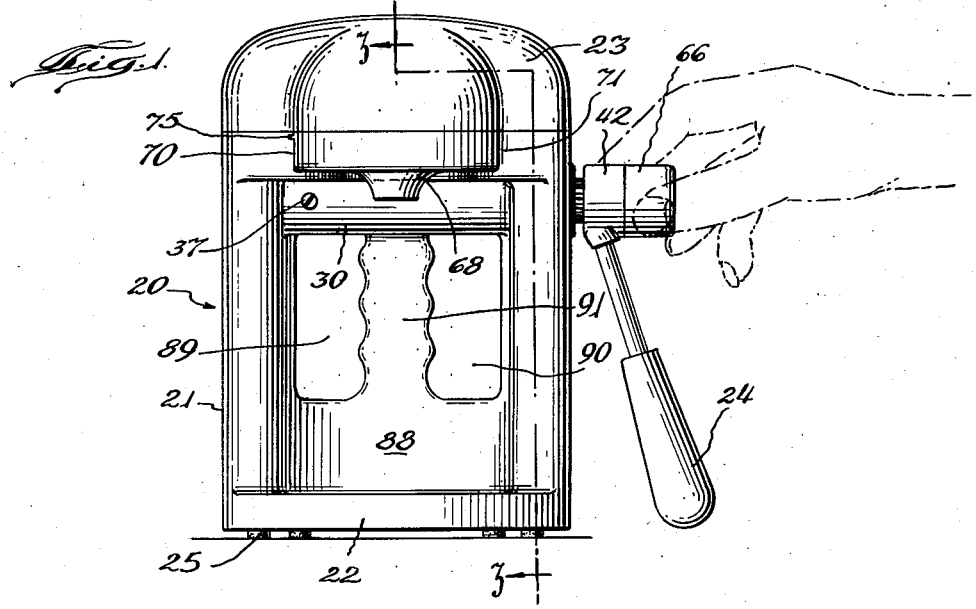
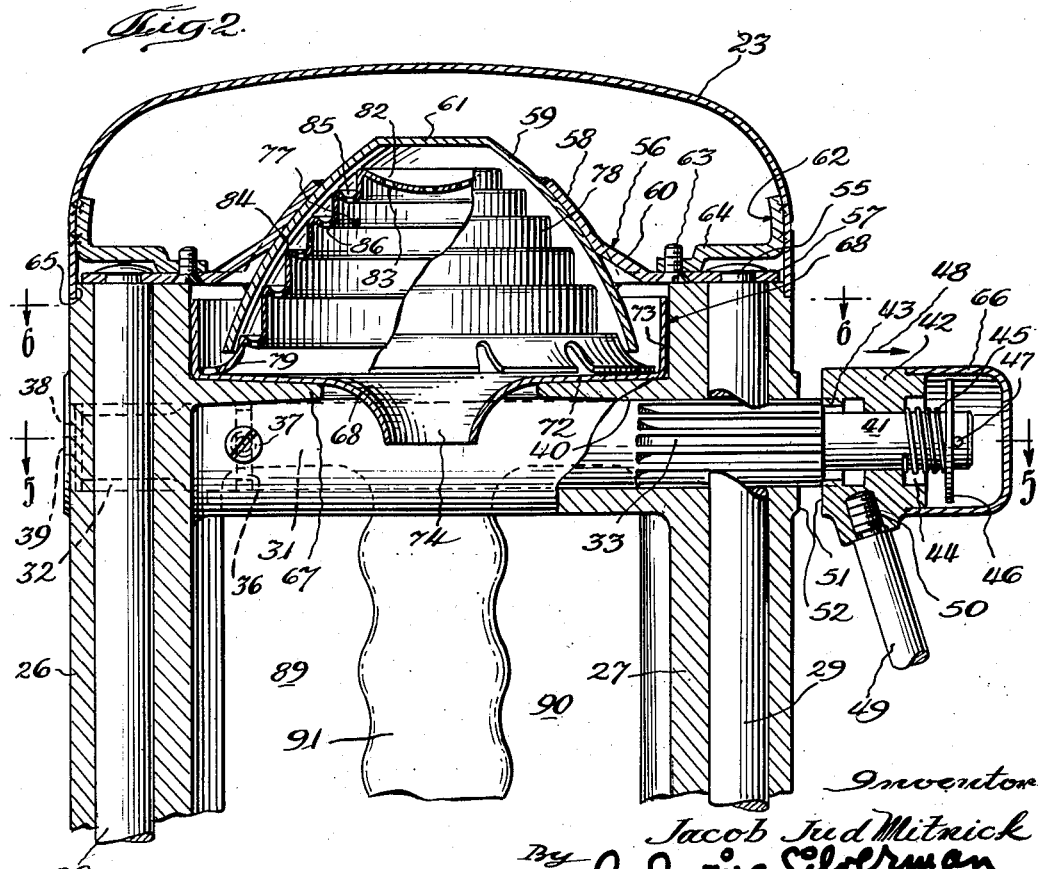
Inventor
Jacob Jud Mitnick
By J. Irving Silverman
Attorney Oct. 17, 1950      J. J. MITNICK      2,526,258
FRUIT JUICE EXTRACTOR Filed June 24, 1947      3 Sheets-Sheet 2

Inventor
Jacob Jud Mitnick
By J. Irving Silverman
Attorney

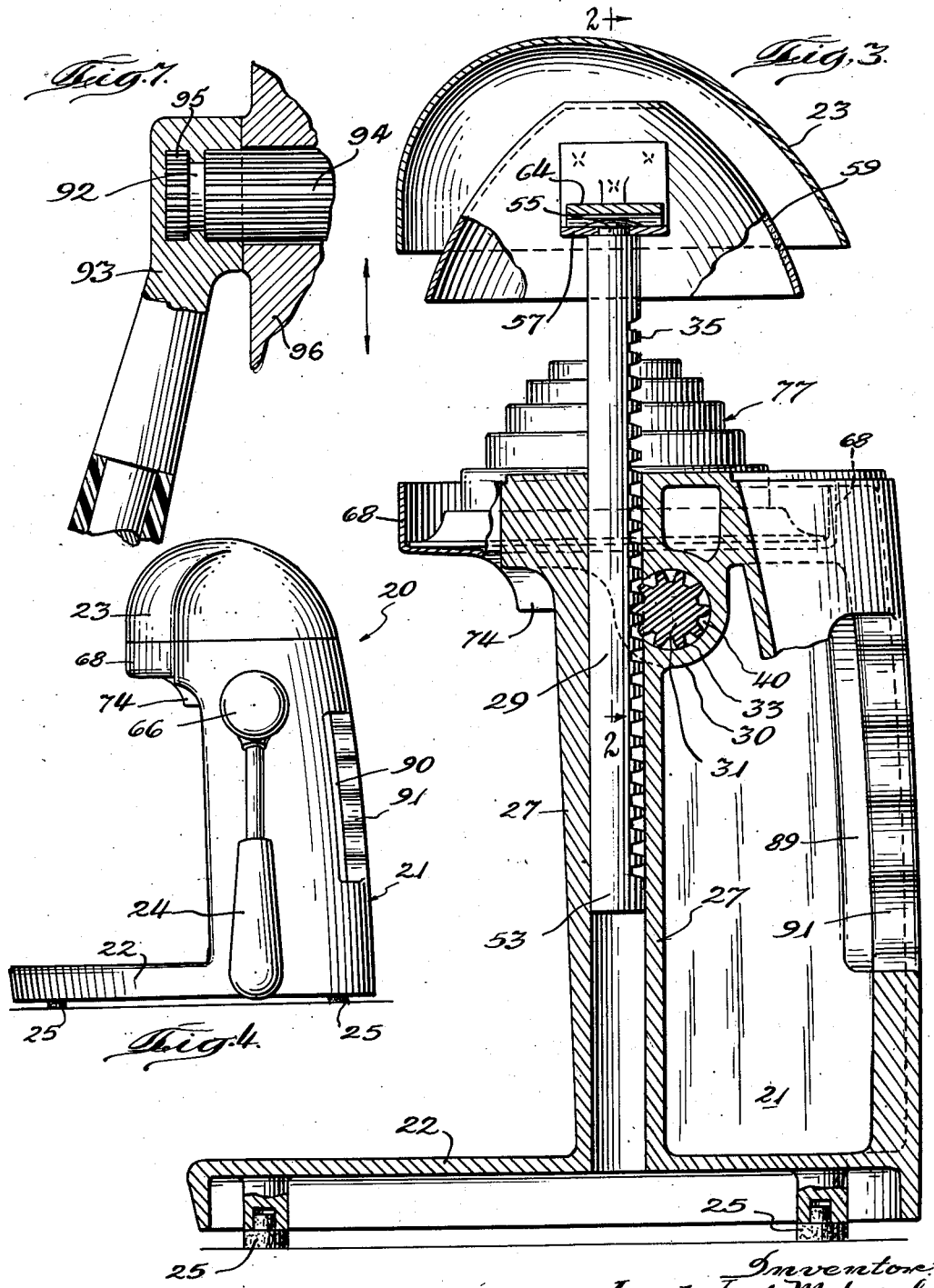

Patented Oct. 17, 1950

2,526,258

UNITED STATES PATENT OFFICE 2,526,258

FRUIT JUICE EXTRACTOR

Jacob Jud Mitnick, Chicago, Ill., assignor of one-half to Hirsch E. Epstein, Chicago, Ill.

Application June 24, 1947, Serial No. 756,686

12 Claims. (Cl. 100—42)

This invention relates to fruit juice extracting devices and more particularly to a fruit juice extracting device to be used in the extracting of juices from citrus fruits, especially in the home.

The fruit juice extractors contemplated by the invention herein are compound acting, that is to say, amplified mechanical means are used to exert a greater force upon the fruit being subjected to same than could be done by direct manual action. This is achieved by the use of rack and pinion mechanisms, the operator rotating the pinion by means of a lever, and the rack moving means into engagement with a stationary part of the device, the fruit being disposed between moving and stationary parts. This action expresses the juice from the fruit.

In order for great pressure to be applied to the fruit for the purpose of attaining maximum efficiency, some prior devices have aligned the axis of pressure with the rack so that the rack is arranged above the stationary portion of the expressing means and is moved downwardly upon same. Such devices are exemplified in U. S. Patent No. 2,183,804, issued to S. Bloomfield, December 19, 1939. Obviously, such construction results in a comparatively tall unwieldly device, most suitable for commercial uses at bars, fountains, and the like, same not being practical for ready stowage, as required of a device to be used for juice extraction in the home. Other devices, which have alleviated the unwieldiness have arranged the rack to move parallel to the axis of pressure, depending upon a bridging member to transfer the force from the rack to the stationary member. This expedient is exemplified in U. S. Patent No. 2,131,440, issued to H. C. Johnson, September 27, 1938. In this type of device the member which is used to transmit the force to the stationary portions of the device is subjected to a cantilever force by reason of its arrangement and hence must be extremely strong in construction in order to withstand the pressure applied. For a home device the parts of such apparatus cannot be made large and hence same have been subject to considerable breakage, binding of the mechanism, undue wear, and twisting and bending of the parts.

The primary object of my invention is to provide a device of the character described in which the pressure is applied to the fruit evenly and along a perpendicular axis, but in which the rack means transmitting the force are arranged parallel to the axis to produce a compact fruit juice extractor.

Another object of the invention is to provide a construction for a fruit juice extractor in which the means bridging from the rack means to the axis of pressure upon the fruit is not subject to any cantilever forces and hence which will eliminate bending, breaking or binding of the parts.

Another object of the invention is to provide a fruit juice extractor which will utilize two rack members for applying force upon the fruit being squeezed whereby the forces acting upon said rack members will be substantially all tension.

Still another object of the invention is to provide a construction for a fruit extracting device in which a single pinion member is rotated to move two rack members, said rack members carrying a fruit pressing member therebetween and serving to move same down upon a piece of fruit to express the juice therefrom.

Another object of the invention is to provide a novel construction for a fruit juice extractor in which all of the mechanism required to move the fruit expressing means of the device will be at the sides of the device whereby the back thereof will be unobstructed and capable of being provided with a handle.

Another object of the invention is to provide a novel construction of a fruit juice extractor whereby assembly of the device will be expediated while providing an efficient and simple mechanism.

Other objects of the invention lie in the constructional details of the device whereby two rack members can be used to provide the expressing force thereof.

Other objects of the invention are to provide a device of the character described which will be made of a minimum of parts; which will be capable of being manufactured economically and easily; and which will be capable of being readily assembled on a mass production basis.

Still a further object of the invention is to provide a novel mechanism whereby the handle of the device may be de-clutched from the pinion to permit the racks and pressure cup to be moved up or down manually.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a front elevational view of a fruit juice extractor embodying my new invention.

Fig. 2 is a sectional view of the upper portion of the device taken generally along the line 2—2 of Fig. 3 and in the direction indicated by the arrows.

Fig. 3 is a sectional view along the line 3—3 of Fig. 1 in the direction indicated by the arrows.

Fig. 4 is a side elevational view of the device.

Fig. 7 is a fragmentary sectional view of a method of attaching a modified form of handle for my device.

Figure 5:
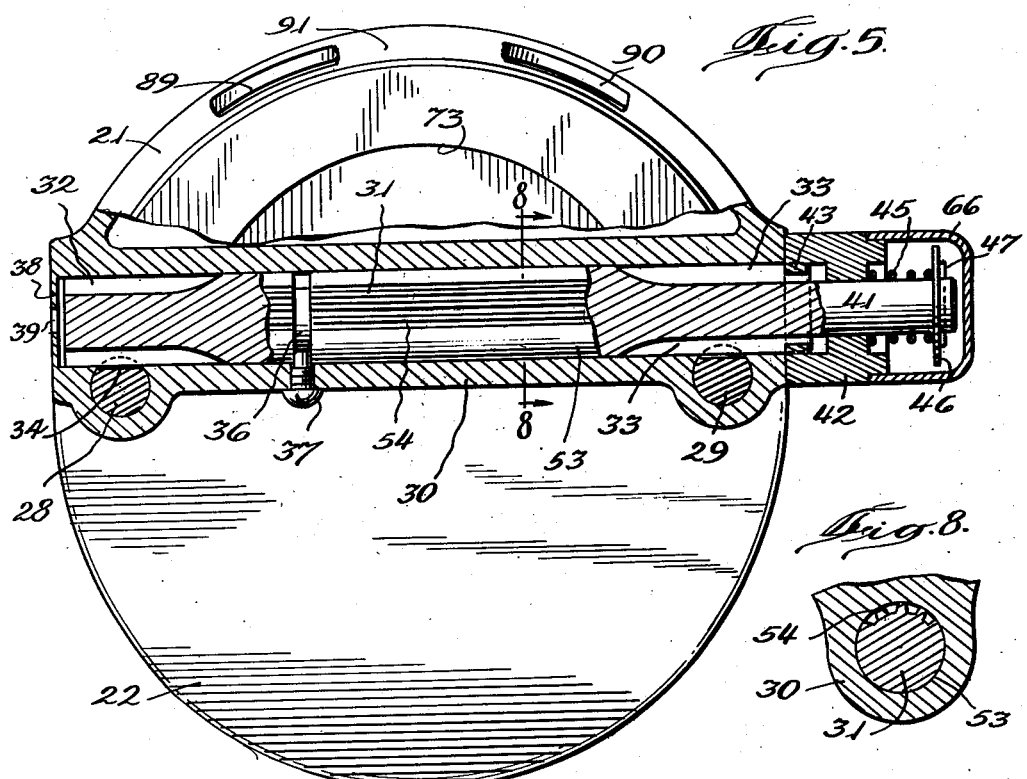
Fig. 5 is a sectional view taken through the device along the line 5—5 of Fig. 2 in the direction indicated by the arrows.

The reference character 20 designates generally my new fruit juice extractor, which comprises a standard 21 having a generally U-shaped formation in a horizontal plane, a base 22 for the standard adapted to carry a container or the like into which the juice is intended to drain, a cover member 23, and a handle or lever member 24. The cover member 23 carries juice expressing means and is raised by manipulation of the handle 24. A piece of fruit is inserted in the appropriate place on the standard 21 as will be described, and by further manipulation of the handle 24 the cover member 23 is lowered, expressing the juice from the piece of fruit and causing same to drain into the container as will be described.

The base 22 has feet which may be formed as rubber discs 25 to prevent slipping of the extractor 20 or marring of the surface upon which same rests. At each side of the standard 21 are formed hollow columns 26 and 27 within which are disposed toothed racks 28 and 29, same being adapted to slide longitudinally within said hollow columns. A bearing housing 30 is formed integrally with the standard 21 and same extends across the standard between the two columns 26 and 27, with its bore or passageway 40 substantially tangentially of the racks 28 and 29.

A pinion shaft 31 is journalled in said bearing housing for rotation therein, same being provided with gear teeth at 32 and 33 for engaging with matching teeth 34 and 35 of the racks, so that if said pinion shaft 31 is rotated the racks 28 and 29 will move upwardly or downwardly. The shaft 31 has a groove 36 cut therein which is adapted to align with a fillister tip screw 37 or the like inserted through the bearing housing 30 to prevent axial movement of the shaft 31. The left end of the shaft 31 as viewed in Fig. 2 is slightly spaced from the end 38 of the journal bore 40, said end being either formed integrally with the housing 21 or attached thereto as a plug. An opening 39 may be provided for introducing lubricant. The passageway 40 extends completely through the opposite side of the housing 21 and the right hand teeth 33 of the shaft 31 extend outwardly therefrom. The shaft 31 carries a reduced diameter extension 41 at the right hand end thereof. A clutch member 42 is mounted on said extension 41 for free sliding motion. The inner face of said member 42 is provided with teeth 43 for engaging the free end of the pinion teeth 33. On the opposite face of the clutch, there is provided a spring seat 44 within which the coiled spring 45 is adapted to engage, said spring 45 being held upon the extension 41 by a washer 46 blocked by a pin 47. The spring 45 is arranged normally to urge the clutch teeth 43 into engagement with the teeth 33 so that the rotation of clutch member 42 will rotate the pinion shaft 31. However, the operator may grasp the clutch member 42 as shown in Fig. 1 and pull same outwardly as indicated by the arrow 48 to disengage clutch teeth 43 from pinion teeth 33 so that the pinion shaft 31 may be rotated without rotating clutch member 42. The handle 24 is attached to a lever 49 which is screw threaded into the clutch member 42 at 50. The operator rotates clutch member 42 by means of this handle and lever. Note that in Figs. 1 and 2 the clutch member 42 is shown disengaged, while in Figs. 5 and 6 the clutch is shown engaged, with the face 51 thereof abutting the bearing boss 52 provided therefor on the side of the housing 21.

The rack members 28 and 29 are circular in cross-section and are not toothed for a short space at the bottoms thereof as shown at 53 in Fig. 3 in order to prevent the withdrawal thereof out of the columns 26 and 27.

Figure 8:
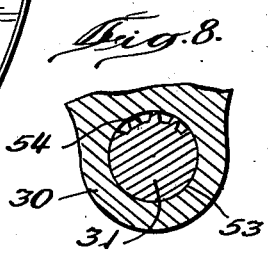
Fig. 8 is a sectional view taken through the center of the pinion along the line 8—8 of Fig. 5.

In order to assemble the racks 28 and 29 within the columns 26 and 27 and the pinion shaft 31 within its passageway 40, the pinion shaft has a few teeth 54 cut throughout the length thereof as shown in Figs. 5 and 8. Thus, to assemble, the racks 28 and 29 are inserted, the end 32 of the pinion shaft 31 inserted in the right end of passageway 40 and the pinion shaft 31 rotated until the teeth 54 will engage with the teeth 34 and 35 of the racks. Then the pinion shaft 31 is pushed home and the screw 37 inserted. It is impractical to use a shaft which is toothed completely about its circumference because this would cause undue friction on the interior wall of bearing housing 30.

At their upper ends, the rack members 28 and 29 are fixedly secured by rivets 55 to identical attaching straps 56. Each strap 56, has a horizontal portion 57 which acts as stop means to limit downward motion of racks 28 and 29, and an upwardly bent portion 58 which follows the general outer contour of the pressure cup 59, and is welded thereto. A strengthening rib 60 at the bend is advantageous. It is seen that cup member 59 bridges the racks 28 and 29 and moves up and down therewith. The pressure cup 59 is preferably of imperforate integral construction and has a flattened top portion 61. The horizontal portions 57 each carry a bracket 62 attached thereto by screws 63, said brackets being welded to the inner surface of cover 23 so that the cover will mask the cup 59 and members 56 and move therewith. Note the bend 64 in each member 62 to clear rivets 55. The cover member 23 may be adapted for seating on shoulder 65 so that the device presents a trim appearance when not in use.

The clutch member 42 is capped as shown at 66 to protect the operator from the mechanism thereof.

Figure 6:
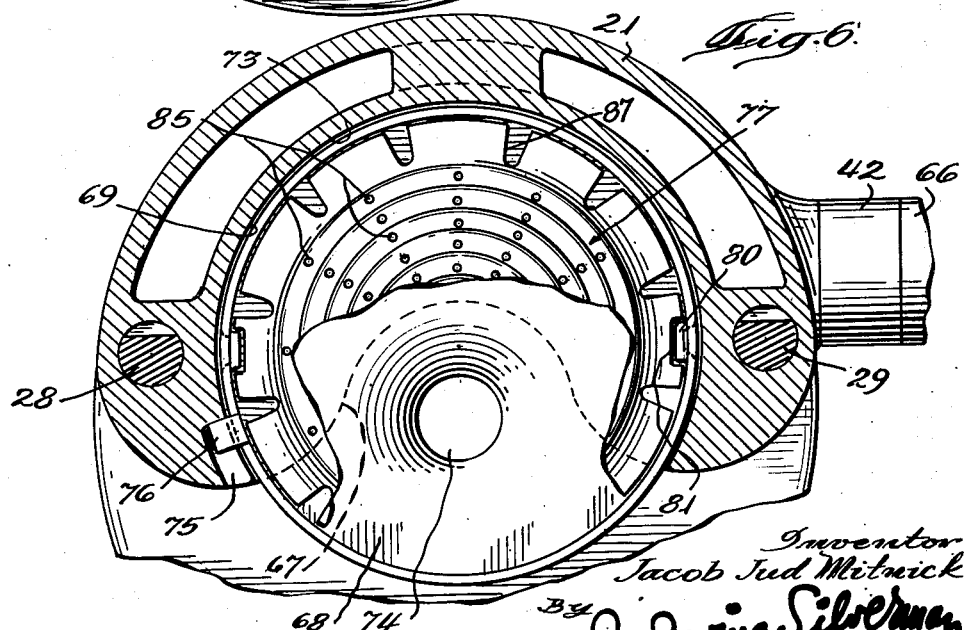
Fig. 6 is a similar view taken along the line 6—6 of Fig. 2.

The housing 21 has a substantially U-shaped web or seat 67 best shown in Fig. 6, which carries thereon a juice cup 68. The seat 67 has an arcuate side wall 69 which is substantially greater in extent than 180° so that when inserted therein, the cup 68 will be prevented from slipping out by the lips 70 and 71 on opposite sides thereof. The cup 68 has a sloping base 72, adapted to be accommodated on the sloping surface of seat 67, and an upstanding annular side wall 73 adapted to be loosely held within arcuate wall 69. A drain 74 is provided set forward of the center of the cup as shown in Fig. 6 to clear the bearing housing 30 and so that the container for catching the juice need not be set back very far upon the base 22 and the cup 68 need not be positioned higher on the standard 21. The wall 69 is slotted at 75 to cooperate with the lug 76 of cup 68 properly to center the drain 74.

Loosely resting within the cup 68 is the male expressing member 77 whose purpose it is to cooperate with cup 59 in extracting the juice from the fruit placed thereon. The male expressing member 77 follows generally the internal shape of the cup 68 but is formed of a plurality of steps 78 of vertical dimension increasing downwardly, having an outwardly flared flange 79 resting in the cup 68. The cup 68 has inwardly struck or otherwise formed keys 80 adapted to engage slots 81 formed in flange 79 for aiding in seating same and preventing rotation thereof. The top of the male expressing member 77 is concave as shown at 82 and perforated at 83 to cooperate with flat top portion 61 in expressing juice from the end of the fruit. Each step is provided with a relatively sharp edge 84 and a trough 85 having perforations 86. The edges 84 scrape the fruit on the inside thereof, the troughs 85 catch the juice and add to the sharpness of the edges 84, and the perforations 86 drain off the troughs 85. Large slots 87 are formed in flange 79 to drain the overflow from troughs 85. During the expressing action the juice is forced into the perforations 83 and 86 and quickly extracted from the fruit. The increasing height of steps 78 adds to the efficiency of the device since it causes the pressure from cup 59 to be evenly distributed over the fruit segment being held by male expressing member 77.

By reason of the construction outlined above the force applied by pressure cup 59 is centered between the rack member 28 and 29, said members dividing the force between them. During this application, the rack members, exclusive of rivet ends 55, are substantially subjected only to tension, and the bridging members 56 and 59 are not liable to twist or shear, or bend due to cantilever action. Also by reason of the fact that the columns 26 and 27 are alongside of the axis of pressure (the geometric center of the pressure cup 59) and not behind same, as in all other constructions of this type, the rear wall 88 of the standard 21 is not used to house any mechanism whatever and may be advantageously provided with openings at 89 and 90 to form thereby a handle 91. This handle permits the device conveniently to be used and carried.

The device operates in the usual manner. The handle 24 is de-clutched, and the cover 23 and pressure cup 59 are raised manually. A half of a citrus fruit is placed face down upon the male expressing member 77, during which time the clutch member 42 may be released, holding the racks 28 and 29 up. Then the handle 24 is once more de-clutched, the movable members lowered to their bottom-most extent until the cup 59 engages the fruit half, the handle 24 released and the clutch 42 permitted to engage teeth 33, and then pressure applied by rotating handle 24 in a counter-clockwise direction as viewed in Fig. 3. Juice flows out of drain 74 and caught in a container placed thereunder.

If desired a clutch mechanism need not be used, in which case the pinion shaft is provided with a groove 92 at the protruding end thereof and a handle 93 is molded thereon. In Fig. 7 the shaft is designated 94 and the protruding end 95, while the standard is designated 96.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a fruit juicer, a standard of generally U-shaped formation in horizontal plan, the open end of the U facing forward, a pair of elongated members reciprocably mounted for vertical movement in the arms of the U and extending out of the standard and carrying means cooperating with the standard for squeezing fruit, and means for simultaneously moving said elongated members from a side of the U, the base of the U being perforated to form a handle for said standard for carrying said juicer.

2. In a fruit juice extractor, a standard, means for pressing upon said standard and adapted to have a fruit half interposed between itself and the standard for extracting juice therefrom, said standard having means mounted thereon carrying said pressing means, and means for moving said carrying means, said carrying means including a rack, and said moving means including a pinion meshing with said rack and having the teeth thereof extending outside of said standard, and a lever mounted on said pinion for limited sliding motion and having teeth engageable with said pinion teeth in clutching action, whereby said lever may be used to rotate said pinion when said teeth are enclutched, but said pinion is free of said lever when said teeth are declutched.

3. In a device of the character described comprising a standard having a pair of reciprocable racks mounted therein, a rotatable pinion housed in said standard, extending between said racks and adapted to reciprocate the racks when rotated, and a pressure member provided on the top ends of said racks for squeezing fruit disposed upon said standard, a seat formed on said standard between said racks and above said pinion housing and including an arcuate generally horizontal flange having an upstanding wall greater than 180° in extent and opening towards the front of the standard, and a drain cup adapted to be disposed on said seat and catch fruit juice, and having an eccentrically arranged drain spout on the bottom thereof extending past the flange whereby a container placed on said standard between the mountings of said racks will catch said juice, whereby the position of the pinion housing will not serve to increase the overall height of said device.

4. In a fruit juice extractor, a standard having spaced vertical bored columns, a horizontally arranged bored housing extending between the columns with its bore substantially tangential of the vertical bores, rack members reciprocable in the vertical bores, a pinion shaft rotatable within the housing and cooperatively enmeshed with the rack members whereby to reciprocate the same in unison during rotation of the pinion member, means connected between the columns for supporting fruit thereon in juice expressing position, pressure means secured between the rack members adapted to move into engagement with the fruit supporting means during movement of the racks, said pressure means comprising an inverted cup member and said racks secured thereto on diametrically opposed sides thereof, and said fruit supporting means including means for draining the expressed juice therefrom without interference with said housing, and means for rotating the pinion member from externally of the housing.

5. In a fruit juice extractor, a standard, said standard having means for supporting fruit thereon in position to be pressed and including a drain spout, pressure means adapted to be moved into engagement with the fruit supporting means for squeezing the fruit thereon, a pair of spaced apart, simultaneously vertically reciprocable rack members mounted upon said standard, means for guiding said members, and a pinion shaft extending between and enmeshing with said rack members and journalled upon the standard whereby to reciprocate the rack members in unison upon rotation of the pinion shaft, the drain spout being spaced laterally of the pinion shaft, the upper ends of the rack members being adapted to move above the standard and having the pressure means secured therebetween for movement therewith, said pressure means and fruit supporting means having a vertical pressure axis parallel with the axes of the rack members and located midway between said rack member axes whereby to distribute the pressure equally between said rack members.

6. In a fruit juice extractor, a base, a pair of spaced apart hollow columns secured to and extending above the base, stationary fruit juice extracting pressure means supported between the columns at the upper ends thereof, a tubular housing extending between the columns at right angles thereto below the stationary pressure means, a pair of rack members reciprocable into and out of the tops of the column in telescoping relationship therewith, movable fruit juice extracting pressure means secured to and bridging the upper ends of the rack members, a single pinion member journalled within the tubular housing enmeshed with the rack members and adapted to reciprocate said members for causing the movable pressure means to engage against the stationary pressure means, and means for rotating said pinion member from externally of said housing, said movable pressure means comprising an inverted cup member and said racks secured thereto on diametrically opposed sides thereof.

7. In a fruit juice extractor, a base, a pair of spaced apart hollow columns secured to and extending above the base, stationary fruit juice extracting pressure means supported between the columns at the upper ends thereof, a tubular housing extending between the columns at right angles thereto below the stationary pressure means, a pair of rack members reciprocable into and out of the tops of the column in telescoping relationship therewith, movable fruit juice extracting pressure means secured to and bridging the upper ends of the rack members, said movable pressure means comprising an inverted cup member and said racks secured thereto on diametrically opposed sides thereof, a single pinion member journalled within the tubular housing enmeshed with the rack members and adapted to reciprocate said members in unison during rotation of said pinion member for causing the movable pressure means to engage against the stationary pressure means, and means for rotating said pinion member from externally of said housing, the stationary pressure means including a drain spout spaced laterally of the tubular housing whereby to drain juice without interference with said tubular housing.

8. In a fruit juice extractor, a base, a pair of spaced apart hollow columns secured to and extending above the base, stationary fruit juice extracting pressure means supported between the columns at the upper ends thereof, a tubular housing extending between the columns at right angles thereto below the stationary pressure means, a pair of rack members reciprocable into and out of the tops of the column in telescoping relationship therewith, movable fruit juice extracting pressure means secured to and bridging the upper ends of the rack members, said movable pressure means comprising an inverted cup member and said racks secured thereto on diametrically opposed sides thereof, a single pinion member journalled within the tubular housing enmeshed with the rack members and adapted to reciprocate said members in unison during rotation of said pinion member for causing the movable pressure means to engage against the stationary pressure means, and means for rotating said pinion member from externally of said housing, said stationary pressure means including a seat, a removable drain cup disposed upon said seat, and a male pressure member arranged within the cup to drain expressed juice into said cup, said cup having a spout spaced laterally of the tubular housing whereby to drain juice from the cup without interference with said tubular housing.

9. In a fruit juice extractor, a base member adapted to have a fruit juice container disposed thereon, a pair of spaced apart vertical hollow columns having their upper ends open and their lower ends secured to the base member and adapted to have the container disposed therebetween, stationary extracting means disposed between the columns and including a drain spout, a horizontally arranged pinion shaft housing extending between and connected with the columns to the rear thereof whereby the container will be adapted to be disposed forwardly of said housing, racks reciprocable in the columns, a pinion shaft in the shaft housing enmeshed with the racks and adapted to reciprocate the upper portions of the racks in and out of the open ends of the columns, and a movable extracting member secured to the upper ends of the racks and adapted to be moved against the stationary extracting means to squeeze fruit thereby and extract the juice therefrom, said movable extracting member including an inverted cup member and said racks secured thereto on diametrically opposed sides thereof, the spout being spaced laterally of the pinion shaft housing whereby to direct extracted juices into the container without interference with said shaft housing.

10. In a fruit juice extractor in which a pressure cup is adapted to be squeezed against a male expressing member with a half of fruit interposed therebetween for extraction of the juice thereof, a standard carrying said male expressing member and having a central cylindrical bearing surface and a pair of spaced apart vertically reciprocable racks mounted thereon carrying said pressure cup, the central cylindrical bearing surface being horizontally arranged between the racks, and means for reciprocating said racks, said means including a pinion shaft having teeth formed at opposite ends thereof and being journalled in said bearing surface, said racks having portions at the bottom ends thereof without teeth cut therein to act as stop means, and said pinion shaft having means for permitting assembly of the racks and pinion shaft in said standard, comprising a relatively small number of teeth in a portion of the outer surface thereof and extending from end to end to enable said shaft to move past said racks while being inserted in said bearing surface during assembly thereof.

11. In a fruit juice extractor, a standard, said standard having means for supporting fruit thereon in position to be pressed and including a drain spout, a pair of spaced apart simultaneously vertically reciprocating rack members mounted upon said standard, and means for guiding said rack members, fruit pressing means secured between said rack members for movement therewith, a rotatable pinion member mounted between said rack members and enmeshing therewith, said pressing means comprising an inverted cup member and having said rack members secured thereto on diametrically opposed sides thereof.

12. In a fruit juice extractor, a standard, said standard having means for supporting fruit thereon in position to be pressed and including a drain spout, a pair of spaced apart simultaneously vertically reciprocating rack members mounted upon said standard, and means for guiding said rack members, fruit pressing means secured between said rack members for movement therewith, a rotatable pinion member mounted between said rack members and enmeshing therewith, said pressing means comprising an inverted cup member and having said rack members secured thereto on diametrically opposed sides thereof, said spout being spaced laterally from the pinion member to enable the juice to be drained without interference, and means for rotating the pinion member.

JACOB JUD MITNICK.

REFERENCES CITED

The following references are of record in the file of this patent:

UNITED STATES PATENTS

| Number | Name | Date |
| --- | --- | --- |
| D. 144,481 | Casanov | Apr. 23, 1946 |
| 210,542 | Kulp | Dec. 3, 1878 |
| 632,387 | White | Sept. 5, 1899 |
| 1,345,963 | Santos | July 6, 1920 |
| 1,958,570 | Flegel | May 15, 1934 |
| 2,018,932 | Thorne | Oct. 29, 1935 |
| 2,090,913 | Johnson | Aug. 24, 1937 |
| 2,142,975 | Majewski | Jan. 3, 1939 |
| 2,306,884 | Jakovicz | Dec. 29, 1942 |
| 2,315,781 | Gerow | Apr. 6, 1943 |
| 2,366,230 | Andrews | Jan. 2, 1945 |
| 2,394,763 | Grant | Feb. 12, 1946 |
| 2,413,866 | DuLaney | Jan. 7, 1947 |

FOREIGN PATENTS

| Number | Country | Date |
| --- | --- | --- |
| 18,735 | Great Britain | of 1889 |